United States Patent [19]

Wada et al.

[11] 4,185,662

[45] Jan. 29, 1980

[54] APPARATUS FOR ACTUATING OPERATING VALVE UNIT FOR WINCH

[75] Inventors: Mitsuyoshi Wada, Yamatotakada; Masami Hashimoto, Hirakata; Teruo Nakahara, Kyoto, all of Japan

[73] Assignee: Kabushiki Kaisha Komatsu Seisakusho, Tokyo, Japan

[21] Appl. No.: 806,193

[22] Filed: Jun. 13, 1977

[30] Foreign Application Priority Data

Jun. 11, 1977 [JP] Japan .................................. 51/67773

[51] Int. Cl.² .................. F16K 11/18; F16K 31/46
[52] U.S. Cl. .................. 137/636; 74/471 R; 74/527; 251/89; 254/187.1
[58] Field of Search .......... 74/471 R; 137/636, 636.1, 137/637

[56] References Cited
U.S. PATENT DOCUMENTS

| | | | |
|---|---|---|---|
| 2,855,958 | 10/1958 | Welty et al. | 137/636.1 X |
| 4,054,083 | 10/1977 | Utter | 137/637 X |
| 4,067,546 | 1/1978 | Matsuda et al. | 137/636 X |

Primary Examiner—Martin P. Schwadron
Assistant Examiner—Richard Gerard
Attorney, Agent, or Firm—Armstrong, Nikaido, Marmelstein & Kubovcik

[57] ABSTRACT

An apparatus for actuating an operating valve unit for winch comprising a casing, a first shaft fixedly supported within said casing, second and third shafts rotatably supported within said casing, said second and third shafts being operatively connected with a hook lever and a boom lever, respectively. Said valve unit includes six valves for operating a hook clutch, a hook brake, a boom clutch, a boom brake, a lifting clutch, and a lower clutch, respectively.

First and second cams are slidably and rotatably mounted on said first shaft and a third cam is rotatably but not slidably mounted on said first shaft. Said first shaft is operatively connected with said second and third shafts, respectively, so as to selectively actuate said valves in response to operations of said hook lever and said boom lever.

5 Claims, 6 Drawing Figures

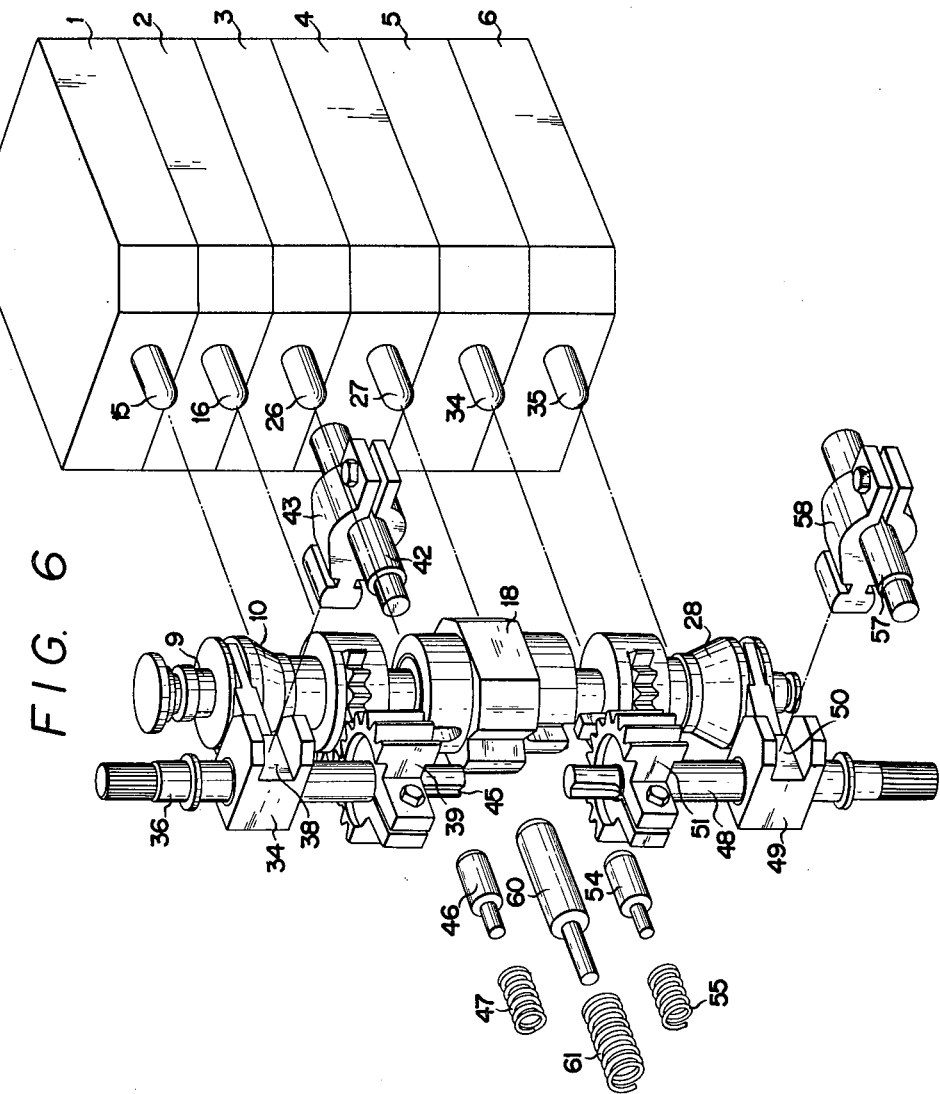

4,185,662

APPARATUS FOR ACTUATING OPERATING VALVE UNIT FOR WINCH

BACKGROUND OF THE INVENTION

This invention relates to an apparatus for actuating control valves for winch adapted for use in pipe laying vehicles and cranes.

A winch of the type having a hook and a boom generally employs several valves for effecting different operations thereof. Those valves are actuated by operating a hook lever or boom lever through connecting means such as linkage as disclosed in U.S. Pat. No. 4,067,546, issued Jan. 10, 1978. Since the linkage of said co-pending application is rather complicated, and therefore the overall structure becomes bulky and complex.

SUMMARY OF THE INVENTION

It is an object of the present invention to provide a compact and simplified apparatus for actuating control valves of a winch.

Another object of the present invention is to provide an apparatus for actuating control valves of a winch which requires a minimum adjustment after its installation.

According to the present invention, there is provided an apparatus for actuating an operating valve unit for a winch comprising a casing, a first shaft fixedly supported within said casing, second and third shafts rotatably supported within said casing, said second and third shafts being operatively connected with a hook lever and a boom lever, respectively. Said valve unit includes six valves for operating a hook clutch, a hook brake, a boom clutch, a boom brake, a lifting clutch, and a lowering clutch, respectively.

First and second cams are slidably and rotatably mounted on said first shaft and a third cam is rotatably but not slidably mounted on said first shaft. Said first shaft is operatively connected with said second and third shafts, respectively, so as to selectively actuate said valves in response to operations of said hook lever and said boom lever.

Other objects, features and advantages of the present invention will be readily apparent from the following description taken in conjunction with the accompanying drawings.

BRIEF DESCRIPTION OF THE DRAWINGS

FIG. 6 is a perspective view showing a device for actuating the valve unit.

DETAILED DESCRIPTION OF THE INVENTION

Figure 1:
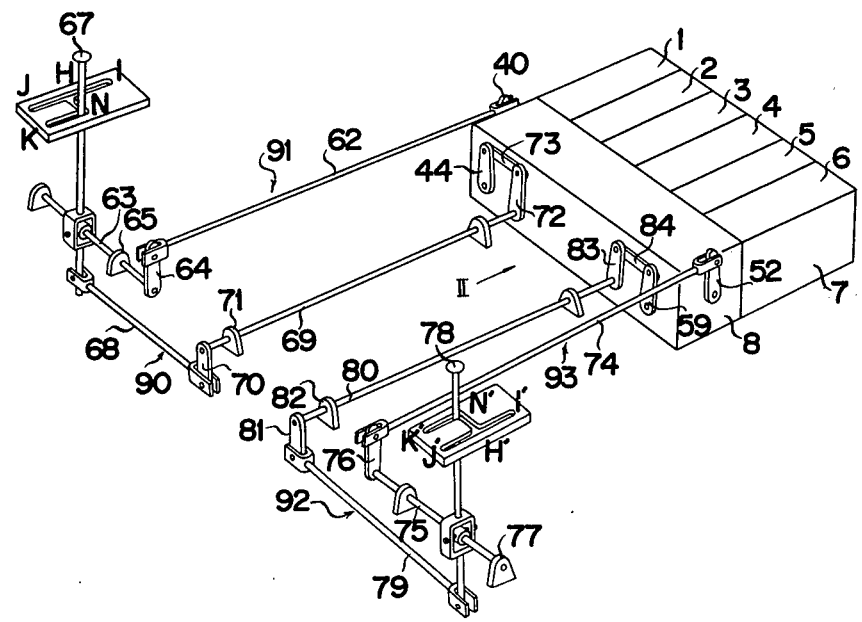
FIG. 1 is a perspective view of a control device according to the present invention.

The present invention will now be described below by way of an embodiment with reference to the accompanying drawings. In the drawings, reference numeral 1 denotes a hook clutch operating valve, 2 a hook brake operating valve, 3 a lowering clutch operating valve, 4 a lifting clutch operating valve, 5 a boom brake operating valve, and 6 a boom clutch operating valve. The above-mentioned valves 1 to 6 are accommodated within a single housing 7. Fixedly secured to the housing 7 is a casing 8 having a shaft 9 mounted therein. The shaft 9 has a cam 10 rotatably and movably mounted thereon. The cam 10 has a sliding groove 11 formed at one end thereof and a gear 12 formed at the other end thereof. The cam 10 has camming faces 13 and 14 formed thereon. Actuating rods 15 and 16 of the hook clutch operating valve 1 and the hook brake operating valve 2 are urged against the camming faces 13 and 14, respectively, by resilient forces of springs not shown. The above-mentioned cam 10 has a dog 17 formed at the other end thereof and which projects downwardly.

The above-mentioned shaft 9 has an intermediate cam 18 which is rotatably mounted thereon and which is prevented from its axial movement by stoppers 19 and 20 fixedly secured to the shaft 9. The intermediate cam 18 has engaging grooves 21 and 22 projecting therefrom and also has camming faces 23 and 24 and a groove 25 formed thereon. Urged against the camming faces 23 and 24 are actuating rods 26 and 27 of the lowering clutch operating valve 3 and the lifting clutch operating valve 4, respectively by resilient forces of springs not shown.

The above-mentioned shaft 9 has also a cam 28 rotatably and movably mounted thereon. The cam 28 has a sliding groove 29, a gear 30 and a dog 31 formed thereon. The cam 28 has also camming faces 32 and 33 formed thereon. Urged against the camming faces 32 and 33 are actuating rods 34 and 35 of the boom brake operating valve 5 and the boom clutch operating valve 6, respectively, by resilient forces of springs not shown.

The casing 8 has a shaft 36 which is rotatably mounted thereon and which has a yoke 37 movably mounted thereon. The yoke 37 is slidably fitted within the sliding groove 11 of the cam 10. The yoke 37 has an engaging portion 38 projecting therefrom. The shaft 36 has a gear 39 fixedly secured thereto and which is engaged with the gear 12. The shaft 36 has a hook raising and lowering lever 40 fixedly secured to the outer end thereof.

Figure 2:
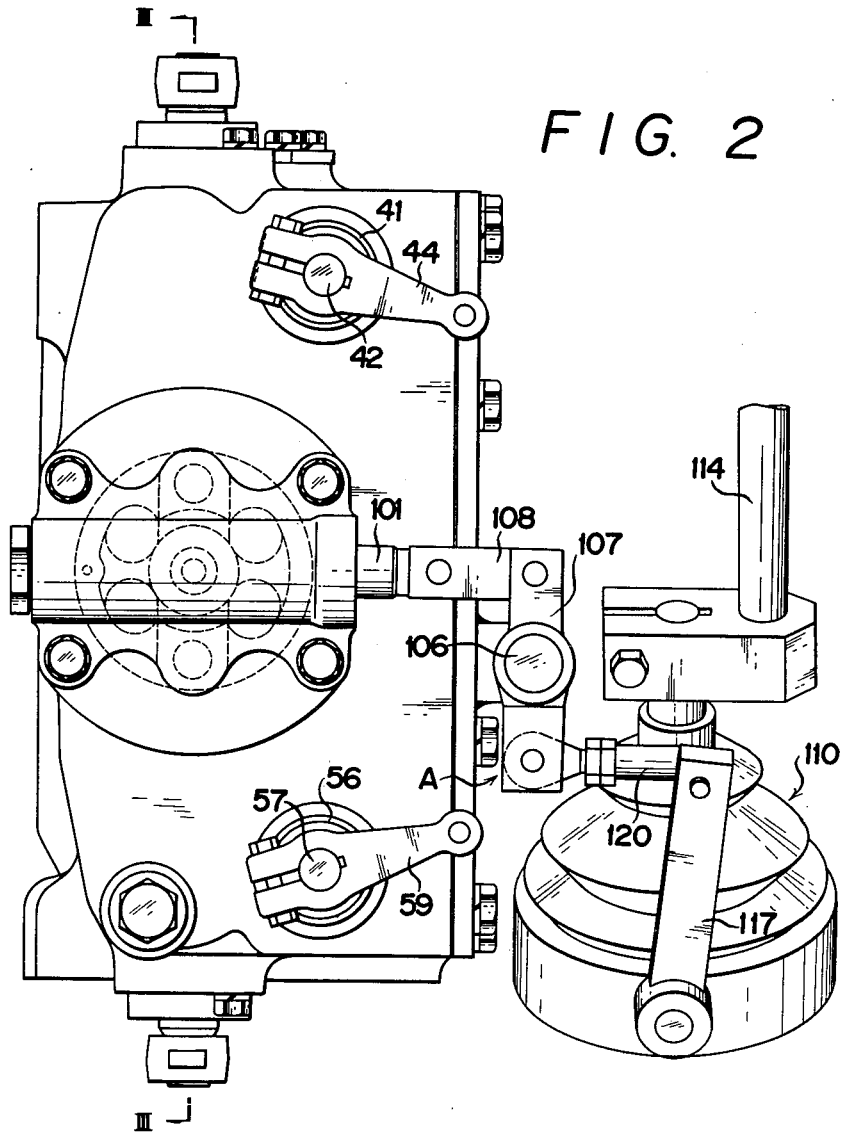
FIG. 2 is a front elevational view of a control device having a safety device incorporated therein according to the present invention.
Figure 3:
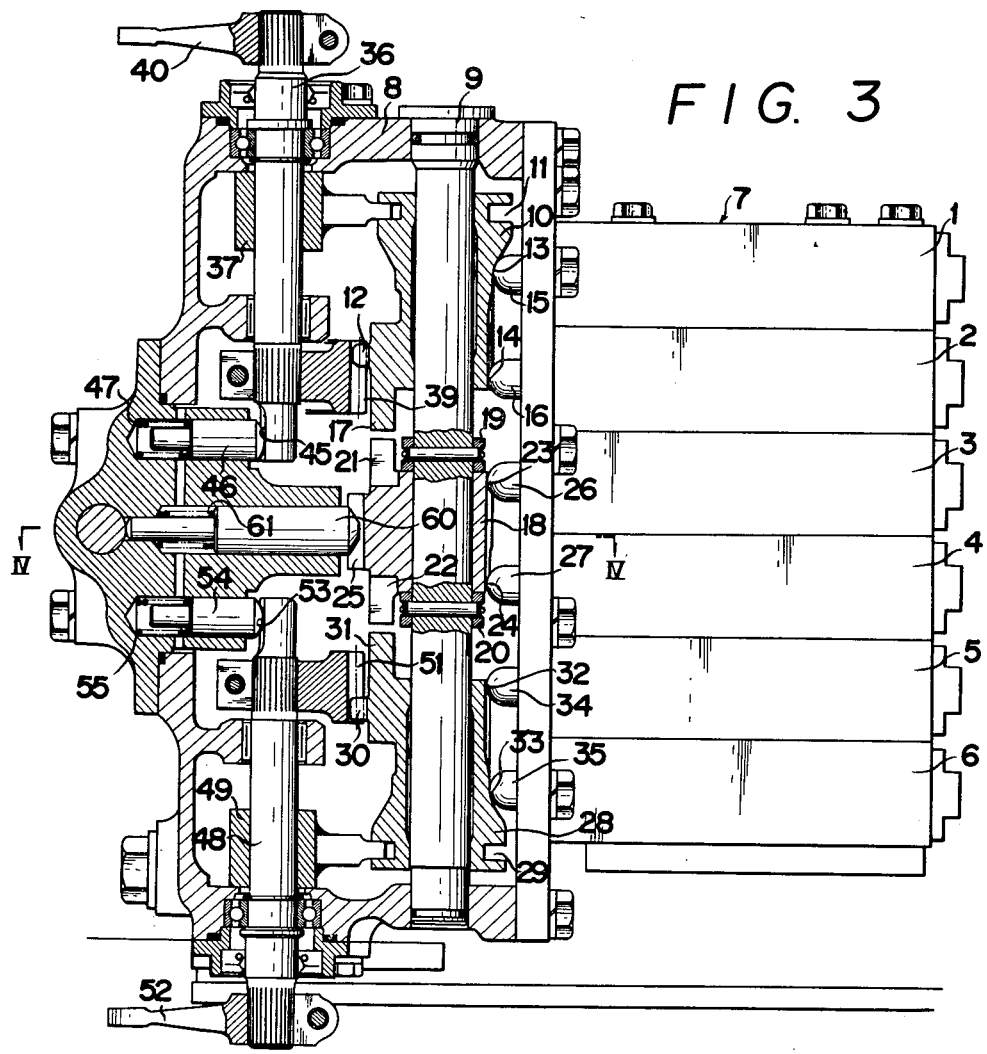
FIG. 3 is a cross-sectional view taken along the line III—III in FIG. 2.

Referring to FIGS. 2 and 6, rotatably mounted in a bearing part 41 of the casing 8 is a shaft 42 having a lever 43 fixedly secured thereto. The lever 43 is rotatably engaged with the engaging portion 38 of the above-mentioned yoke 37. Fixedly secured to the shaft 42 is a hook clutch operating lever 44.

The above-mentioned shaft 36 has a groove 45 formed at the inner end thereof. A detent 43 mounted in the casing 8 is engaged with the groove 45 by a resilient force of a spring 47.

The casing 8 has also a shaft 48 which is rotatably mounted thereon and which has a yoke 49 movably mounted thereon. The yoke 49 is slidably fitted within the sliding groove 29 of the aforementioned cam 28 and has an engaging portion 50 formed thereon. Fixedly secured to the shaft 48 is a gear 51 which is engaged with the gear 30 of the afore-mentioned cam 28. The shaft 48 has a lifting and lowering lever 52 fixedly secured thereto, and also a groove 53 formed thereon. A detent 54 mounted in the casing 8 is engaged with the groove 53 by a resilient force of a spring 55.

Rotatably mounted in a bearing portion 56 of the casing 8 is a shaft 57 having a lever 58 fixedly secured thereto. The lever 58 is rotatably engaged with the engaging portion 50 of the yoke 49. Further, fixedly secured, to the shaft 57 is a boom clutch operating lever 59.

Mounted in the casing 8 is a detent 60 which is engaged with the groove 25 of the aforementioned intermediate cam 18 by a resilient force of a spring 61.

Figure 4:
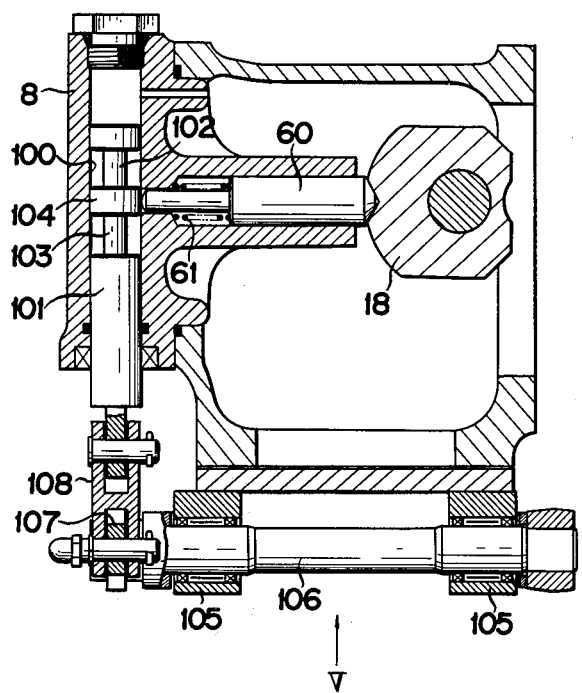
FIG. 4 is a cross-sectional view taken along the line IV—IV in FIG. 3.
Figure 5:
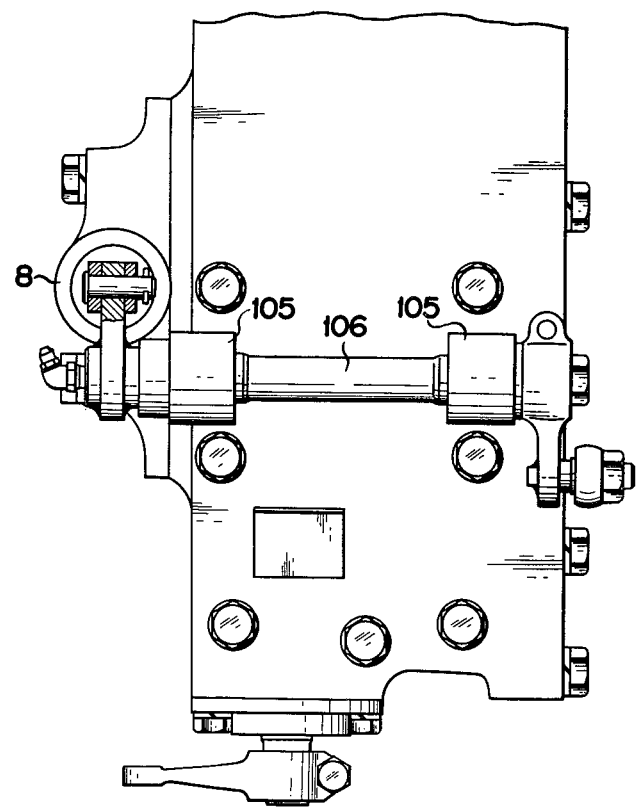
FIG. 5 is an illustration as viewed in a direction shown by an arrow V in FIG. 4.

Referring to FIG. 4, the casing 8 has a hole 100 formed therein in which a spool 101 is fitted. The spool 100 has deduced diameter portions 102 and 103 and a stopper portion 104 formed thereon. The casing 8 has also brackets 105 formed projecting therefrom in which a shaft 106 is rotatably supported. Fixedly secured to the shaft 106 is a lever 107. One end of the lever 107 is connected through a link 108 with the spool 101. The detent 60 is urged against the stopper portion 104. The other end of the lever 107 is connected through a linkage comprising levers 117 and 120 with a safety device 110 as shown in FIG. 2. The safety device 110 is adapted by manipulating lever 114 to axially slide the spool 101 so as to selectively engage the detent 60 with the cam 18 and lock the detent as shown in FIG. 4.

Referring to FIG. 1, the hook lifting and lowering lever 40 is connected through a rod 62 with a lever 64 of a shaft 63 which is rotatably supported by fixed brackets 65. A hook lever 67 is connected to the shaft 63 so that it can be rotated. The lower end of the hook lever 67 is connected through a rod 68 with a lever 70 attached to a rod 69. The rod 69 is rotatably supported by fixed brackets 71 and has a lever 72 fixedly secured thereto. The lever 72 is connected through a link 73 with the hook clutch lever 44.

The boom lifting and lowering lever 52 is connected through a rod 74 with a lever 76 attached to a shaft 75. The shaft 75 is rotatably supported by fixed brackets 77. A boom lever 78 is connected to the shaft 75 so that the former can be oscillated relative to the latter. The lower end of the boom lever 78 is connected through a rod 79 with a lever 81 attached to a rod 80. The rod 80 is rotatably supported by fixed brackets 82. The rod 80 has a lever 83 which is fixedly secured thereto and which is connected through a link 83 with the boom clutch operating lever 59.

The operation of the present invention will now be described hereinbelow.

FIGS. 2 and 4 illustrate the locked position in which the hook lever 67 and boom lever 78 can not be moved in any direction to effectuate their respective functions. While the lever 114 of FIG. 2 is kept in a vertical position, the cam 18 of FIG. 4 remains locked. The cam 18 is prevented from moving by the detent 60. When the lever 114 is moved toward the left, it causes lever 117 to move leftward and forces lever 120 in the same direction. The lever 120 is connected to lever 107 and, as lever 120 pushes on lever 107, it causes lever 107 to swivel on shaft 106. The swivel movement of lever 107 pulls the link 108 to the right. This rightward movement of the link 108 in FIG. 2 represents a downward movement of link 108 in FIG. 4. The downward movement of link 108 pulls stopper 104 downward and allows the detent 60 to be forced back into the reduced diameter portion 102 by the turning cam 18. The cam 18 can compress the spring 61 and move only when the detent can be pushed back into the reduced diameter portion 102. A rightward movement of the lever 114 causes a similar movement of the parts.

For lifting the hook in a single operation, the hook lever 67 is moved from a neutral position "N" to a position "H" and then to a position "I". In this case, the movement of the hook lever 67 from the position "N" to the position "H" turns the hook clutch operating lever 44 through lever link mechanism 90 thereby turning the shaft 42 so as to actuate the lever 43 to move the yoke 37 downwardly. Consequently, the cam 10 is moved downwards so that the dog 17 can be engaged with the engaging portion 21 of the intermediate cam 18. The downward movement of the cam 10 actuates the hook clutch operating valve 1 so as to turn the hook clutch operating valve 1 on or operative.

Further, the movement of the hook lever from the position "H" to the position "I" turns the hook lifting and lowering lever 40 through lever link mechanism 91 so as to turn the cam 10 through the gears 10 and 12 thereby rendering the hook brake operating valve operative to turn the hook brake off, and at the same time turns the intermediate cam 18 through the engaging portion 21 engaged with the dog 17 so as to render the lifting clutch operating valve 4 operative thereby turning the lifting clutch on.

In the next place, in case of lowering the hook lever 67 is moved from the neutral position "N" to position "H" and then to position "J". As mentioned above, the movement of the hook lever from the neutral position "N" to the position "H" turns the hook clutch on. And then, movement of the hook lever from the position "H" to the position "J" renders the hook brake operating valve 2 operative so as to turn the hook brake off or inoperative, and turns the intermediate cam 18 in the direction opposite to that in the case of lifting the hook so as to actuate the lowering clutch operating valve 3 thereby turning the lowering clutch on.

In case of lifting the boom, the boom lever 78 is moved from a neutral position "N'" to a position "H'" and then to a position "I'". The movement of the boom lever from the neutral position "N'" to the position "H'" oscillates the boom clutch operating lever 59 through the lever link mechanism 92 so as to actuate the lever 58 through the shaft 57. As a result, the cam 28 is moved upwards through the action of the yoke 49 thereby permitting the dog 31 to engage with the engaging portion 22. The movement of the cam 28 renders the boom clutch operating valve 6 operative so as to turn the boom clutch on.

Further, movement of the boom lever from the position "H'" to the position "I'" turns the boom lifting and lowering lever 52 through lever link mechanism 93 so as to rotate the shaft 48. As a result, the cam 28 is rotated through the gears 51 and 30 so as to actuate the boom brake operating valve 5 thereby turning the boom brake off, and at the same time the lifting clutch operating valve 3 is actuated so as to turn the lifting clutch on. In case of lowering the boom, the boom lever 77 is moved from the neutral position "N" to position "H'" and then to position "J'". As mentioned above, the movement of boom lever 77 from the neutral position "N'" to the position "H'" turns the boom clutch on. And then, movement of the boom lever 77 from the position "H'" to the position "J'" renders the boom brake operating valve 5 operative so as to turn the boom brake off, and at the same time turns the intermediate cam 18 in the direction opposite to that in the case of lifting the boom so as to actuate the lowering clutch operating valve 3 thereby turning the lowering clutch on.

Next, in case it is desired to allow the hook to fall freely, the hook lever 67 is moved from the neutral position "N" to a position "K" so as to turn the hook lifting and lowering lever 40 through lever link mechanism 91, rotate the shaft 36, rotate the cam 10 through the gears 39 and 12 and actuate the hook brake operating valve 2 thereby turning the hook brake off.

In the next place, when it is desired to allow the boom to fall freely, the boom lever 78 is moved from the neutral position "N'" to the position "K'". As a result, the boom lifting and lowering lever 52 is rotated through the lever link mechanism 93 so as to rotate the shaft 48, rotate the cam 28 through the gears 51 and 30 and actuate the boom brake operating valve 5 thereby turning the boom brake off.

Further, when it is desired to lift the hook and boom at the same time the hook lever 67 is moved from the neutral position "N" to the position "H" and then to the position "I", and at the same time the boom lever 68 is moved from the neutral position "N" to the position "H'" and then to the position "I'".

Further, when it is desired to lower the hook and the boom, the hook lever 67 is moved from the neutral position "N" to the position "H" and then to the position "J", and at the same time the boom lever 78 is moved from the neutral position "N'" to the position "H'" and then to the position "J'".

Where it is desired to fall the hook freely and lift the boom, the hook lever 67 is moved from the neutral position "N" to the position "K", and the boom lever 78 is moved from the neutral position "N'" to the position "H'" and then to the position "I'".

In case of falling the hook freely and raising the boom, the hook lever 67 is moved from the neutral position "N" to the position "K", and the boom lever 78 is moved from the neutral position "N'" to the position "H'" and then to the position "J'". When it is desired to fall the boom freely and moving the hook upwards, the boom lever 78 is moved from the neutral position "N'" to the position "K'", whilst the hook lever 68 is moved from the neutral position "N" to the position "H" and then to the position "I".

In case it is desired to fall the boom freely and lower the hook, the boom lever 78 is moved from the neutral position "N'" to the position "K'", whilst the hook lever 68 is moved from the neutral position "N" to the position "H" and then to the position "J".

In case of falling the hook and boom freely, the hook lever 68 is moved from the neutral position "N" to the position "K", and the boom lever 78 is moved from the neutral position "N'" to the position "K'".

Since various changes and modifications of the present invention will occur to and can be made readily by those skilled in the art without departing from the spirit or concept of the invention, the present invention is not to be taken as limited except by the scope of the appended claims.

What we claim is:

1. An apparatus for actuating an operating valve unit for winch, said operating valve unit including a hook clutch operating valve, a hook brake operating valve, a boom clutch operating valve, a boom brake operating valve, a lifting clutch operating valve, and a lowering clutch operating valve; the apparatus comprising a casing, a first shaft fixedly supported within said casing, a second shaft rotatably supported within said casing, a third shaft rotatably supported with said casing, first cam means slidably and rotatably mounted on said first shaft for actuating said hook clutch operating valve and said hook brake operating valve, a second cam means slidably and rotatably mounted on said first shaft for actuating said boom clutch operating valve and said boom brake operating valve, third cam means rotatably mounted on said first shaft between said first cam means and said second cam means for actuating said lowering clutch operating valve and said lifting clutch operating valve, said third cam means being adapted to be selectively engageable with said first and second cam means, means mounted on said second and third shafts for axially connecting said second and third shafts with said first and second cam means to slidably move said first and second cam means on said first shaft, respectively, and means mounted on said second and third shafts for rotatably connecting said second and third shafts with said first and second cam means, respectively.

2. The apparatus according to claim 1 wherein said second and third shafts are operatively connected with a hook lever and a boom lever, respectively.

3. The apparatus according to claim 2, further comprising lock means provided within said casing between said second and third shafts for selectively locking the rotation of said third cam means about said first shaft.

4. The apparatus according to claim 3, further comprising control means provided outside said casing for controlling the operation of said lock means, said control means being operatively connected with said lock means.

5. The apparatus according to claim 4, wherein said lock means comprises a detent slidably disposed within a cylindrical hole formed in said casing, said detent being selectively engageable with said third cam means, spring means disposed within said cylindrical hole so as to urge said detent towards said third cam means, and a spool having a reduced diameter portion slidably disposed within another cylindrical hole formed in said casing, said spool being disposed at right angles to said detent and being operatively connected with said control means.

* * * * *